United States Patent [19]

Hanson

[11] 4,272,929
[45] Jun. 16, 1981

[54] TOWER AND METHOD OF CONSTRUCTION

[76] Inventor: Bror H. Hanson, 7182 Broadbridge, Fair Haven, Mich. 48023

[21] Appl. No.: 69,120

[22] Filed: Aug. 23, 1979

[51] Int. Cl.³ ............................................. E04H 12/00
[52] U.S. Cl. ......................................... 52/40; 52/296; 52/726; 52/725
[58] Field of Search .................., 52/40, 725, 726, 727, 52/796, 797, 733, 169.13, 170, 296; 403/11, 12, 362, 200

[56] References Cited

U.S. PATENT DOCUMENTS

| | | | |
|---|---|---|---|
| 580,311 | 4/1897 | Hammett | 52/169.13 |
| 693,947 | 2/1902 | Bunce | 52/170 |
| 833,791 | 10/1906 | Moran | 52/169.13 |
| 3,514,918 | 6/1970 | Archer | 52/725 |
| 3,667,176 | 6/1972 | Mackay | 52/726 |
| 3,793,794 | 2/1974 | Archer | 52/725 |
| 4,092,079 | 5/1978 | Swanson | 52/726 |
| 4,099,354 | 7/1978 | De Pirro | 52/169.13 |

FOREIGN PATENT DOCUMENTS 459035  4/1925  Fed. Rep. of Germany .............. 52/40

OTHER PUBLICATIONS

"Wind Power Digest, Small WECS Conference 1979, Access Catalog update," Title p. & p. 5, p. 11, p. 24, p. 40 and p. 55.

Primary Examiner—Price C. Faw, Jr.
Assistant Examiner—Henry E. Raduazo
Attorney, Agent, or Firm—Burton, Parker & Schramm

[57] ABSTRACT

A tower for a wind generator made up of a plurality of segments where each segment fits into the one below it and is adjustable relative that lower segment. The lower segment is anchored in the ground and includes a stirrup which holds the lowest section of the tower a distance above the bottom of the hole so that when cement is poured into the hole to anchor the tower, the cement flows up into the interior of the tower to give additional support. Adjustment means in the form of set screws are provided where each pair of sections join to allow alignment of the sections to vertical.

1 Claim, 10 Drawing Figures

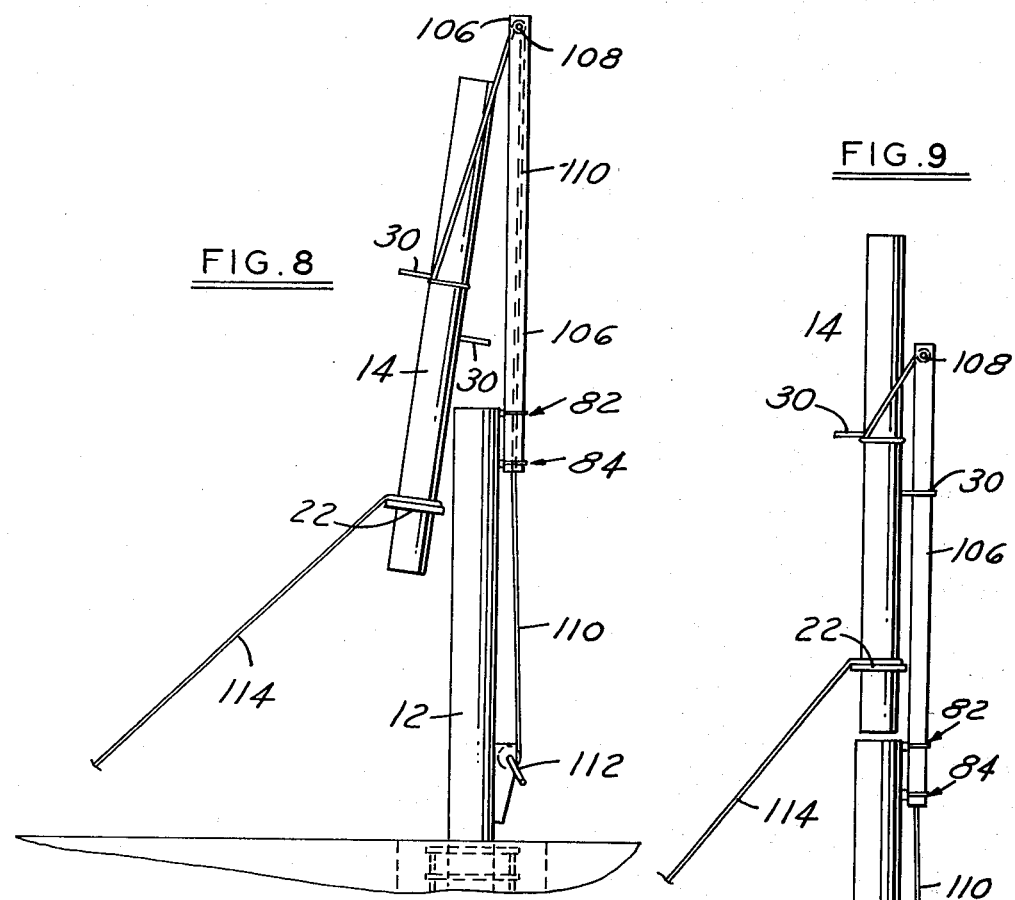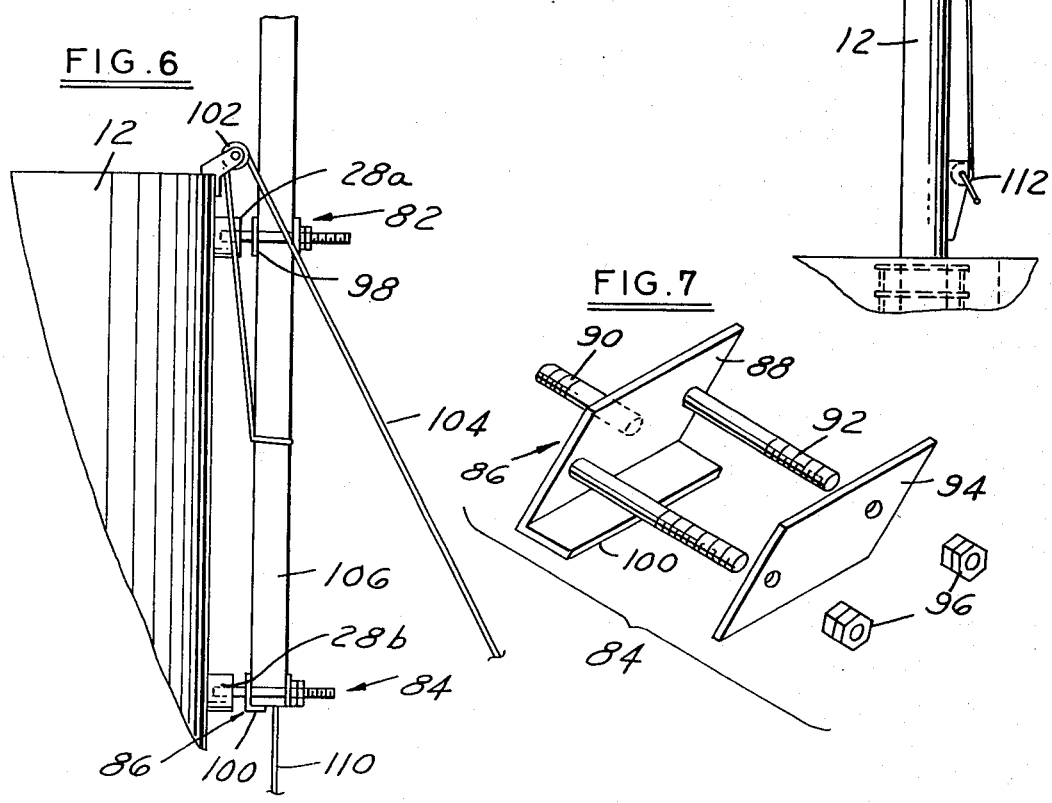

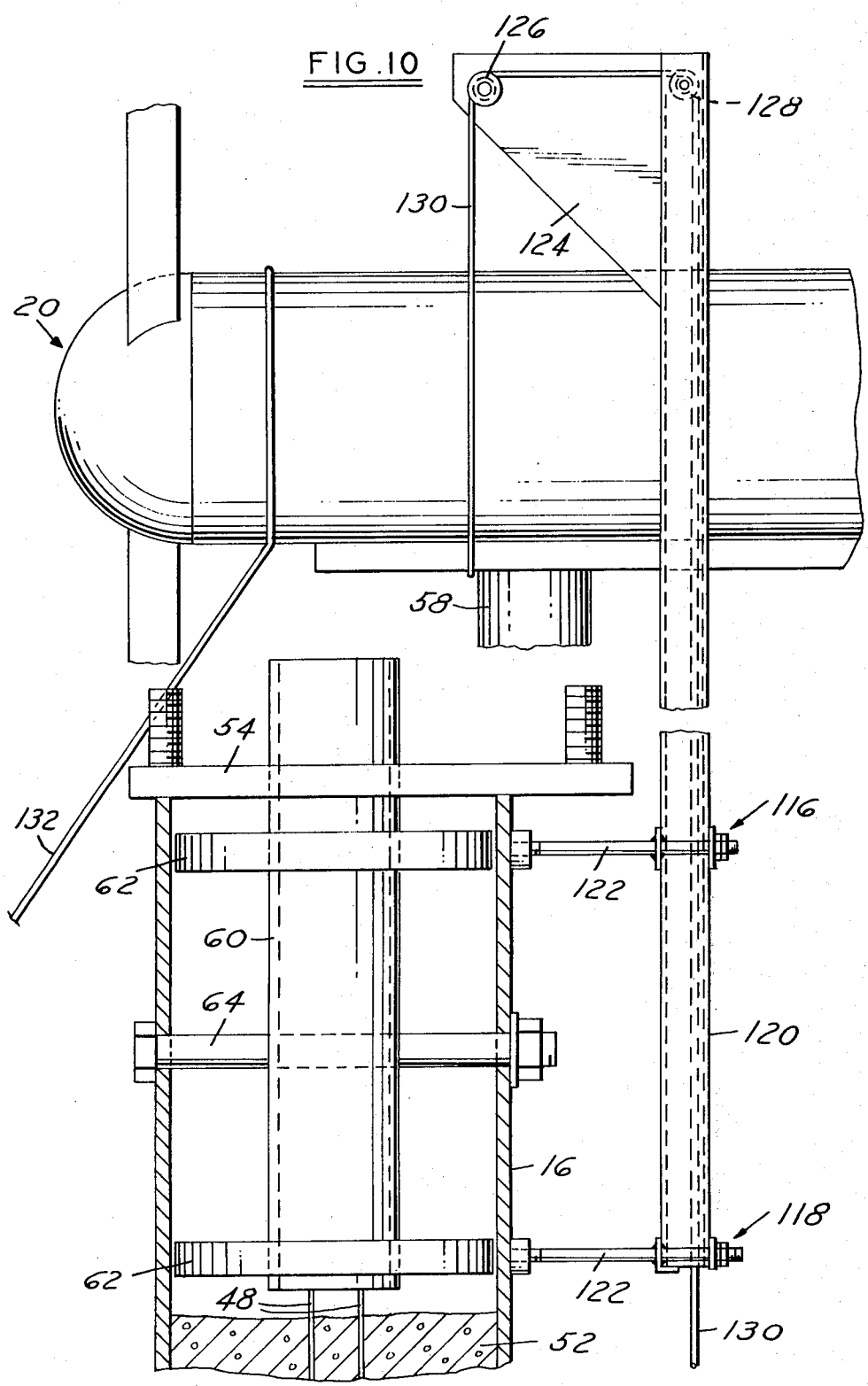

TOWER AND METHOD OF CONSTRUCTION

DESCRIPTION

Background of the Invention

A great deal of interest is presently being shown in the development of alternative energy sources. One type of energy in which people are showing interest in using is that from the wind. New and more efficient wind turbine generators are being developed, but for these to be efficient a steady wind source is needed. This can normally be obtained by raising the generator a sufficient distance above the ground to remove the generator from the area in which the wind is disrupted by surface effects. Normally, this requires a tower of forty feet or higher.

Large towers are needed to support these machines in that the generators are quite heavy and the towers need to withstand strong lateral forces caused by the wind. These towers require guy wires, large base areas, and are generally not very aesthetic. None of the generators in the past could conveniently be raised to the top of the tower without extensive use of large machinery such as a boom crane. Cranes are prohibitively expensive for an individual to obtain, especially in the more rural areas where wind power often holds more attraction.

BRIEF SUMMARY OF THE INVENTION

This invention relates to towers and their construction, particularly towers to support wind turbine generators and a method of construction that can be easily undertaken by a single person.

The tower of this invention has a number of sections, the lowest of which is anchored in the ground, preferably by cement which is allowed to enter the interior of the lowest section. Atop the lowest section is placed a second section which is slideable within the lowest section a predetermined distance which is determined by stop means which may take the form of a ring. Also included as part of the tower are locking and aligning means for holding the sections together such that the second section is directed toward vertical. If more than two sections are used, the third and succeeding sections are slid within the preceding section and aligned and locked in the same manner as the second section to the lowest section.

Specifically for a tower to produce wind energy, a wind turbine generator is placed on top of the highest section.

Also described is a method of erecting a tower, including the steps of anchoring the first section in the ground, attaching a gin pole to the first section with a rope supported on the gin pole on which a second section is raised above the first section and then lowered within the first section and the sections are locked.

The same basic steps are followed for each additional section.

BRIEF DESCRIPTION OF THE DRAWINGS

FIG. 6 shows the attachment of a gin pole to a tower segment.

FIG. 7 shows the lower bracket in a disassembled condition.

FIG. 8 shows the raising of the second segment of the tower.

FIG. 9 shows the positioning of the second segment over the first or lower segment.

FIG. 10 shows a cross-section of the upper segment during positioning of a wind turbine generator.

DETAILED DESCRIPTION

Figure 1:
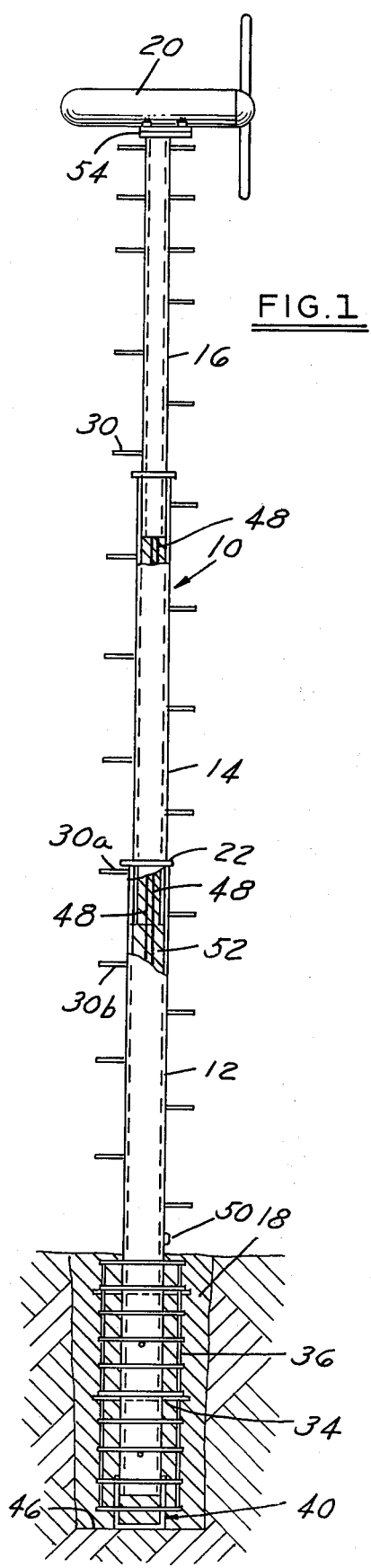
FIG. 1 is a side view of a tower embodying the invention with portions of the tower cut away to show its interior and the ground cut away to show additional structure.
Figure 3:
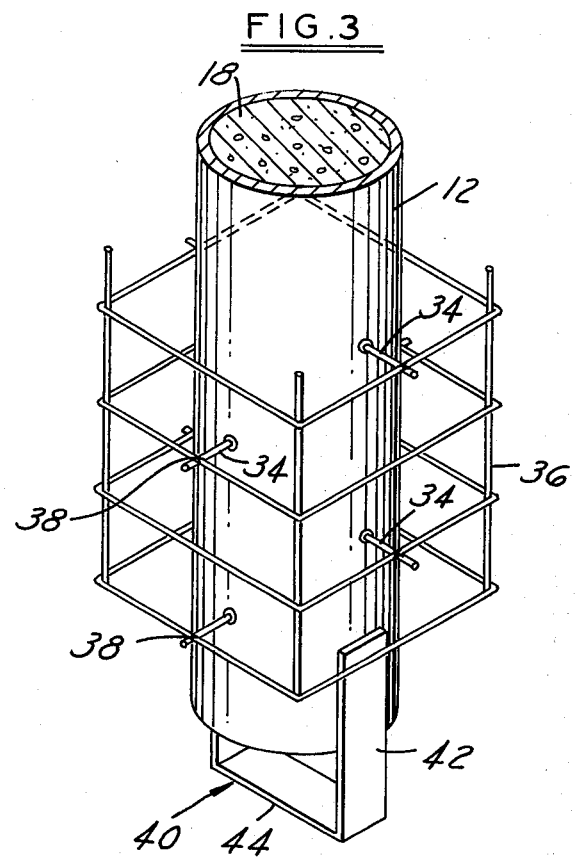
FIG. 3 is a perspective view of the lower, below-grade, portion of the tower.
Figure 2:
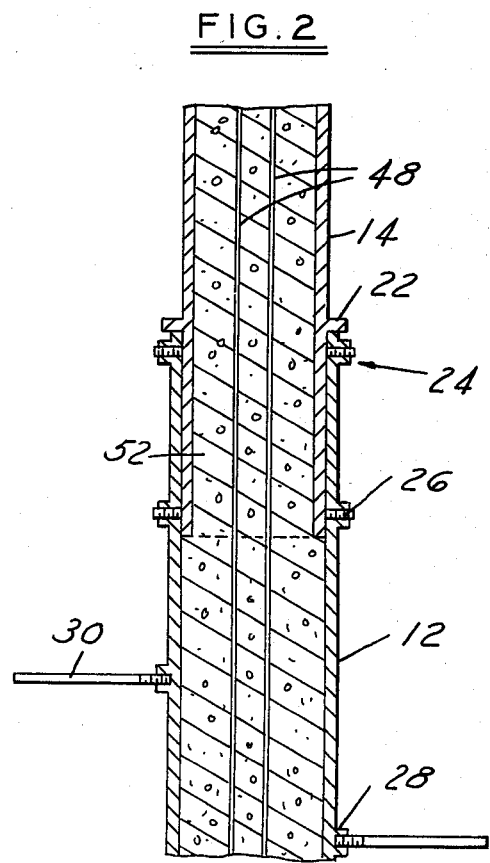
FIG. 2 is a partial cross-section in the area where two segments of the tower are joined.

The tower 10 of the invention comprises a plurality of sections, in this embodiment there being three tubular sections 12, 14 and 16. The lowest section 12 is embedded in cement 18 to anchor and hold it erect, and the top section 16 supports the wind turbine generator 20. Each successively higher section is made of progressively smaller diameter tubes so that each tube will slip easily within the proceeding section. It has been found that all sections should be of a length to allow easy transportation and assembly.

Means are provided to limit the distance a section enters into a preceding section. This takes the form of ring 22. The ring abuts the top of the preceding section, thus, limiting the distance the section will slide into the lower section. Means are also provided for adjusting the fit between adjacent sections so as to allow the upper sections to remain as near vertical as possible. These adjustment means 24 include four pair of set screws 26 at the top of sections 12, 14. Each pair of set screws is positioned 90° from adjoining pairs. The tightening of the set screws also acts to lock the sections together.

Staggered along the sides of the tubing are nuts 28 which are welded to the tubing sections. Into these nuts are normally screwed threaded ladder legs 30, but as noted in the method of construction described below, other attachments may be screwed into these nuts. A portion of the lower section which will be inserted in a hole 32 in the ground and surrounded by concrete 18. Through this portion there are provided cross bars 34 to which is attached cage 36. The cage is attached to the cross bars by wire 38. The wire does not need to be very strong since its only purpose is to join the cage to cross bars during positioning. The cage is included to strengthen the cement surrounding the tower, and since its purpose is to hold the cement together, attachment to the tower itself is not important except in the aiding of erection.

It has been found that the tower gains more secure footing if the cement poured around the lower portion of the tower is also allowed to enter the hollow inside of the lower segment of the tower. Means are provided for allowing this entry in the form a U-shaped stirrup 40. The top of the sides 42 of the stirrup are joined to the bottom of the lower section 12 of the tower so that the base 44 of the stirrup is spaced a distance below the bottom of the lower segment. Placement of the base of the stirrup on the bottom 46 of the hole allows cement to enter the hollow interior of the lower section.

Wiring 48 from the generator 20 passes from the generator through the interior of the sections and out hole 49 in the lower section near ground level. The wiring is connected to electrical outlet 50 which is then positioned over hole 49.

To give additional stability to the tower, a filler such as additional concrete 52 may be used to occupy the interior of the sections to substantially the top of the tower. This additional cement dampens natural frequency vibrations caused by the wind to the tower. Finally, at the top of the tower, as best shown in FIG. 10, there is provided a top plate 54 to which the generator 20 will be connected. To allow the wind generator to face the wind, there is normally provided on the wind generator a pivot pin 58. This pin enters the bearing tube assembly 60, which is part of the tower. The bearing tube assembly is positioned in the tower by bars 62 and by thru bolt 64. The wiring 48 from the generator also enters the interior by means of the bearing tube assembly 60. The specifics of the tower for attaching the machine, such as the bearing tube assembly and the top plate, vary depending on what machine is used. Specifications are usually provided by the manufacturer of the machine for these parts.

The tower of this invention can be assembled in such a manner to allow a single person to erect the tower with little or no mechanized help. The first step in such a procedure is to dig a hole 32 in the ground. It is assumed that the soil around the hole is compact, undisturbed soil, although soil conditions should generally be checked by an engineer prior to construction. In compact, undisturbed soil it is found that the best shape of the hole would be relatively narrow and deep, allowing the amount of cement used to be kept to a minimum. After the hole is dug, it should be covered by a suitable shield 68 so that it remains undisturbed until it is to be used.

Figure 4:
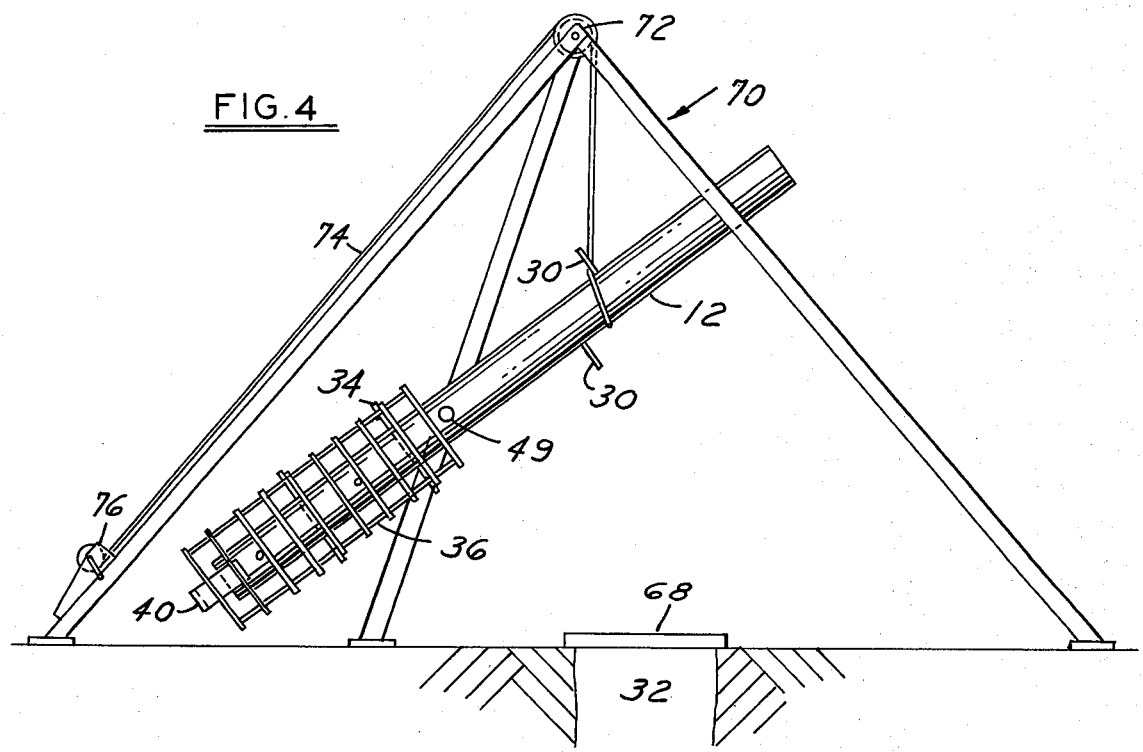
FIG. 4 shows the raising of the lowest segment of the tower during its erection.
Figure 5:
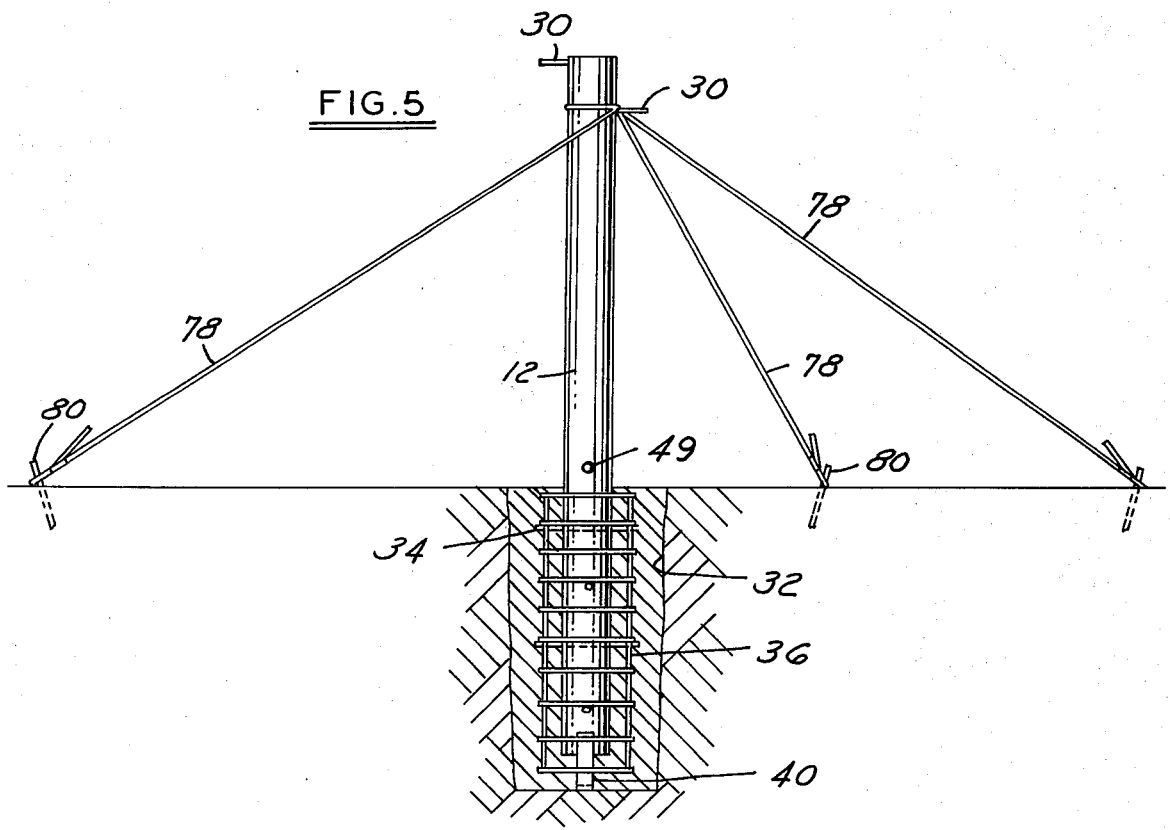
FIG. 5 shows the placement of the lower segment in the ground during erection.

Over the hole is then placed a structure 70 on which the first section is to be lifted. A tripod is normally the most effective such structure. Over a pulley 72 located at the top of the tripod, a rope 74 is positioned. One end of the rope is attached to winch 76 and the other end is tied around the first section 12 slightly above its center of gravity. While the first section is still on the ground, ladder legs should be screwed in above where the rope is tied to insure that the rope does not slip when the section is lifted. Also, additional ropes 78 should be attached to the top of the section as shown in FIG. 5 again with ladder legs 30 helping to keep the ropes from slipping. Note all ladder legs not needed at this time should not be screwed in to prevent them from tangling with the ropes. Finally, the cage 36 should be wired to bars 34. When all this is accomplished, the first section is raised by turning winch 76 as shown in FIG. 4. By tying the rope 74 above the center of gravity, the first section will tend to take a vertical position above the hole as it is raised. The shield 68 of the hole is removed and the first section is lowered into the hole until the stirrup 40 sits on the bottom 46 of the hole.

The ropes 78 attached to the top of the first section are now used to insure that the section is kept as near vertical as possible. The ropes are pulled in three directions by ratchet pullers 80 which include stakes for their positioning in the ground. The ratchet pullers should be positioned as far from the hole as possible to keep the slope in the ropes quite small. The desire is to exert basically horizontal forces on the first section through the rope 78 to position it vertically and hold it firmly in place while the concrete is being poured. It has been found that ropes approximately 100 feet long loaded to 300 to 500 pounds are usually sufficient for a 16 foot first section.

The concrete is then poured in the hole. Since the stirrup braces the first section off the bottom of the hole, the concrete in addition to flowing around the first section also will flow up through the interior. The ratchet pullers 80 should again be adjusted while the cement is wet if any variation from vertical has occurred during the pouring of the cement. The cement is now allowed to dry, 24 hours being usually sufficient.

The next day all the ladder legs in the first section should be inserted so that section may be climbed and the various ropes 74, 78 detached. The top two ladder legs on one side 30a and 30b are now unscrewed. In the nuts 28a, 28b now vacant are screwed brackets 82 and 84. The lower bracket 84 is comprised of a first member 86 which is made up of a L-shaped plate 88, the back of which has threaded peg 90 for screwing into nut 28b and on the other side a pair of threaded cross-members 92. On these cross-members is placed a front plate 94 held in place by nuts 96. The L-shaped plate and the front plate are kept as separated as possible at this point. The upper bracket 82 is the same as the lower bracket except in place of the L-shaped plate there is merely a flat back plate 98. After placement of the brackets and nuts 28, a pulley 102 is hooked on the top of section 12 and a rope 104 is positioned on the pulley with one end tied round gin pole 106. This gin pole has at its top an interior pulley 108 over which is placed a second rope 110. This rope is threaded through the interior of the gin pole and out its bottom. The gin pole is raised into place by placing the top portion of the gin pole between the front and back plates of the brackets and rope 104 is pulled. This causes the gin pole to be raised as it slides through the brackets until the bottom of the gin pole slips over ledge 100 of bracket 84. At this point, the gin pole is in place. Once the gin pole is in position, one end of rope 110 is attached to winch 112. This winch may be screwed into one of the lower ladder leg nuts 28 after removing a ladder leg. The other end of rope 110 is tied around the second section 14 slightly above its center of gravity with ladder legs screwed on above it to keep the rope from slipping. Another rope 114 is tied above ring 22.

As shown in FIG. 8, the second section is now raised until it reaches the position as shown in FIG. 9 above the first section. The lower rope 114 allows positioning of the lower end of the second section above the first section. Additional ropes leading in different directions could have been attached as rope 114 to allow easier positioning. The second section is then lowered into the first section until it is stopped by ring 22. The first section is again climbed by use of the ladder legs and set screws 26 are positioned and tightened. Prior to screwing in the set screws, the set screws should be coated with VIBRA-TITE (trademark of the Oakland Corporation for a coating for screws to prevent loosening from vibrations) or a like substance. The set screws are then adjusted to insure that the second section takes a position as near vertical as possible. This may be needed since despite all precautions there is usually some settling of the concrete.

The ladder legs are now screwed into the second section and the process of connecting the gin pole and raising and adjusting the third section is repeated. If more than three sections are used in the tower, the process is repeated until the top section is positioned.

Once the top section is positioned and adjusted, it is climbed and brackets 116, 118 for a gin pole 120 are put in place as shown in FIG. 10. One difference at this point is that threaded pegs 122 of these brackets is of greater length than the pegs 90 of brackets 82, 84 since due to the additional width found in most wind generators, the gin pole must be further away from the center of the sections so that the pivot pin 58 can fit within the bearing tube assembly.

Also to enable the machine to be correctly positioned the gin pole 120 used to raise the machine includes an upper extention member 124 allowing for vertical lowering of the machine when the bearing tube assembly 60 and pivot pin 58 are aligned. A pair of pulleys 126, 128 are arranged along the top of the pole and extention to guide rope 130 used to raise and lower the machine. A second rope 132 is attached to the machine to align it. Prior to lowering the generator, the wiring 48 for the generator should be lowered through the bearing tube assembly 60. These are then fished out through hole 49 in the lower section and connected to the electrical outlet 50 which is put in place over the hole.

To insure that there is no destruction of the wind turbine generator, the tower supporting the generator must be sufficiently strong to withstand winds of up to 100 miles per hour without deflecting more than 8° from vertical. Use of the above-described tower where three sections are used, each of approximately 16 feet in length, starting with a standard twelve inch diameter pipe, allows a 40 foot tower to be constructed meeting the requirements of a 300 pound wind turbine generator while staying well within the tolerances described above.

It should be noted that by use of this invention, the tower can be varied after the initial machine is placed on it. If, for example, the user of the tower wishes to support a heavier load or perhaps a different machine requiring a different connection, all that need be done is to reverse the steps of assembly, lowering the machine and the various sections starting at the top until the section which it is desired to be replaced is removed. For a different type of machine, all that may be required is removing the uppermost section and replacing it with a similar section having a different means for attaching the new machine to the tower. For a heavier machine, replacement may require changing the structure of the sections to strengthen them and may even require sawing off a portion of the lower section and redrilling holes for the set screws so to vary the characteristics of that section.

I claim:

1. A wind powered generating tower comprising in combination:
   a plurality of tubular sections, including a lower section to be anchored by cement in a hole in the ground and a higher section slideable within and atop the lowest section;
   the distance the higher section slides within the lowest section predetermined by a ring shaped member attached around the exterior of the higher section where the ring abuts the top of the lowest section;
   the lowest section including pairs of set screws positioned around its top so that by tightening selective screws the higher section may be placed at an angle relative the lowest section and where the sections are locked together by the tightening of said set screws;
   the lowest section further including a U-shaped member where the tops of the sides of the U-shaped member are joined to the lowest section and the base of the U rests on the bottom of the hole so to enable the anchoring cement poured around the lowest section to flow past the U-shaped member into the interior of the lowest section;
   each of said sections having staggered nuts welded to the exterior of the tower for holding ladder legs which enable climbing of the tower; and
   a wind tubine generator pivotably connected atop the highest section.

* * * * *